UNITED STATES PATENT OFFICE.

PHILIP R. LACHICOTTE, OF WACCAMAW, (GEORGETOWN P. O.,) SOUTH CAROLINA, ASSIGNOR TO P. R. LACHICOTTE & SONS, OF SAME PLACE.

IMPROVEMENT IN SCOURING AND POLISHING RICE.

Specification forming part of Letters Patent No. 166,992, dated August 24, 1875; application filed April 17, 1875.

*To all whom it may concern:*

Be it known that I, PHILIP R. LACHICOTTE, of Waccamaw, (Georgetown Post-Office,) Georgetown county, South Carolina, have invented a new and useful Improvement in Scouring or Polishing Rice, of which the following is a specification:

The object of this invention is to enable the grains of rice to be thoroughly cleaned, whitened, and polished in a superior manner, in much less time, and with much less breakage of and injury to the grains, than has heretofore been practicable.

The invention consists in the employment of very fine silica-powder, made from burnt rice-chaff, in connection with the ordinary scouring and polishing machines, as hereinafter fully described.

In the preparation of the rice for market, after the rough grains have been hulled by an open running millstone, it is pounded in mortars or subjected to the action of rubbing-machines of various kinds, for the purpose of removing, by rubbing or friction, the inner coat or covering, which adheres firmly to the grains.

In this process, and particularly in the inferior grades of rice, many grains are imperfectly cleaned, a large amount of breakage occurs, and the rice has a dull, dark color, which is prejudicial to its sale.

I use the same polishing and scouring machines that are ordinarily used; but I mix with the bulk of rice a quantity of very fine silica-powder made from burnt rice-chaff, the effect of which is to thoroughly clean, whiten, and polish the grains in much less time, and with much less breakage of and injury to the grains, than has heretofore been possible.

Silica-powder from burnt rice-chaff has heretofore been used for polishing fine cutlery or finishing metal surfaces. This I do not claim; but

What I claim as my invention, and desire to secure by Letters Patent, is—

The method of scouring and polishing rice by applying friction-surfaces to the previously-hulled article commixed with the ash of rice-chaff, as set forth.

PHILIP R. LACHICOTTE.

Witnesses:
M. T. SANDERS,
D. G. SNELLIS.